(12) United States Patent
Kim et al.

(10) Patent No.: US 12,068,667 B1
(45) Date of Patent: Aug. 20, 2024

(54) COMPACT, LIGHTWEIGHT, AND COMPATIBLE ELECTRIC MOTOR COMPLEX COOLING SYSTEM

(71) Applicant: GEM CO., LTD., Busan (KR)

(72) Inventors: Younggyun Kim, Busan (KR); Seungsoo Hong, Busan (KR)

(73) Assignee: GEM CO., LTD., Busan (KR)

( * ) Notice: Subject to any disclaimer, the term of this patent is extended or adjusted under 35 U.S.C. 154(b) by 0 days.

(21) Appl. No.: 18/429,351

(22) Filed: Jan. 31, 2024

(30) Foreign Application Priority Data

May 26, 2023 (KR) .................. 10-2023-0068121

(51) Int. Cl.
*H02K 9/193* (2006.01)
*H02K 9/06* (2006.01)
*H02K 9/22* (2006.01)

(52) U.S. Cl.
CPC ............. *H02K 9/193* (2013.01); *H02K 9/06* (2013.01); *H02K 9/227* (2021.01)

(58) Field of Classification Search
CPC .......... H02K 9/19; H02K 9/193; H02K 9/227; H02K 9/06; H02K 9/197; H02K 5/20; H02K 5/203; H02K 5/18
See application file for complete search history.

(56) References Cited

U.S. PATENT DOCUMENTS

| | | | | |
|---|---|---|---|---|
| 2013/0076168 A1* | 3/2013 | Memminger | ............ | H02K 9/12 310/54 |
| 2015/0097450 A1* | 4/2015 | Xu | ............ | H02K 9/197 310/54 |
| 2022/0181947 A1* | 6/2022 | Mutzl | ............ | H02K 5/203 |

FOREIGN PATENT DOCUMENTS

| | | | |
|---|---|---|---|
| CN | 115313761 A | * 11/2022 | |
| DE | 102010001705 A1 | * 8/2011 | ............. H02K 16/00 |
| JP | 2003-219605 A | 7/2003 | |
| JP | 2017-50913 A | 3/2017 | |
| KR | 10-2011-0026822 A | 3/2011 | |
| KR | 20110026822 A | * 3/2011 | |
| WO | WO-2021114606 A1 | * 6/2021 | |

OTHER PUBLICATIONS

Kim (KR 20110026822 A) English Translation (Year: 2011).*
Geyer (DE 102010001705 A1) English Translation (Year: 2011).*
Ji (WO 2021114606 A1) English Translation (Year: 2021).*
Liu (CN 115313761 A) English Translation (Year: 2022).*

* cited by examiner

*Primary Examiner* — Tulsidas C Patel
*Assistant Examiner* — Robert E Mates
(74) *Attorney, Agent, or Firm* — You & IP, LLC

(57) ABSTRACT

Provided is a compact and lightweight motor complex cooling system with compatibility in which by providing a structure that circulates internal air without introducing air from the outside, an air-cooled radiator used in the conventional air cooling scheme is unnecessary, and only a water-cooled radiator is required, contributing to miniaturization and weight reduction of a device, and the compact and lightweight motor complex cooling system can be installed in an existing motor, and thus has compatibility, and is configured by a combination of air cooling and water cooling using coolant, allowing direct cooling to the end coil windings and the front of shafts of a rotor and a stator and by air cooling, and has excellent cooling efficiency through water cooling.

1 Claim, 8 Drawing Sheets

COMPACT, LIGHTWEIGHT, AND COMPATIBLE ELECTRIC MOTOR COMPLEX COOLING SYSTEM

CROSS-REFERENCE TO RELATED APPLICATIONS

This application claims the priority of Korean Patent Application No. 10-2023-0068121 filed on May 26, 2023, in the Korean Intellectual Property Office, the disclosure of which is incorporated herein by reference.

BACKGROUND OF THE INVENTION

Field of the Invention

The present invention relates to a compact and lightweight motor complex cooling system with compatibility. More particularly, the present invention relates to a compact and lightweight motor complex cooling system with compatibility in which by providing a structure that circulates internal air without introducing air from the outside, an air-cooled radiator used in the conventional air cooling scheme is unnecessary, and only a water-cooled radiator is required, contributing to miniaturization and weight reduction of a device, and the compact and lightweight motor complex cooling system can be installed in an existing motor, and thus has compatibility, and is configured by a combination of air cooling and water cooling using coolant, allowing direct cooling to the end coil windings and the front of shafts of a rotor and a stator by air cooling, and has excellent cooling efficiency through water cooling.

Description of the Related Art

In general, a motor, which is one of the main components of an electric vehicle, is configured to include a stator and a rotor that is inserted into the stator to be rotatable around a rotation axis.

During the operation of the motor, high-temperature heat is generated from the stator and the rotor, and when the temperature inside the motor rises, the driving and power generation efficiency of the motor rapidly decreases. Due to these problems, various researches are being actively conducted to cool the motor to maintain the driving and power generation efficiency of the motor.

Meanwhile, a cooling scheme for a traction motor mainly used in railway vehicles includes a semi-enclosed cooling scheme and a fully enclosed cooling scheme. The semi-enclosed cooling scheme uses natural air cooling using a driving wind generated while the vehicle is driven, or a forced air cooling scheme using a cooling fan and a blower motor to drive the fan.

However, by applying a semi-enclosed enclosure structure, there is a disadvantage that the lifespan of the motor is shortened due to the failure of the motor due to the inflow of external foreign substances.

In addition, the fully enclosed traction motor can greatly improve the maintainability of the motor because there is no inflow of external substances, but because the heat flow to the outside is small, it is necessary to develop optimal cooling technology to solve the heat problem occurring in the motor.

In addition, the cooling system of the conventional fully enclosed traction motor uses the forced air cooling system used in the existing semi-enclosed induction motor, and there are research cases at home and abroad on cooling systems using water cooling or oil cooling.

SUMMARY OF THE INVENTION

The present invention is contrived to solve the problem, and has been made in an effort to provide a compact and lightweight motor complex cooling system with compatibility that can effectively cool coils, windings of a rotor, and a stator, which generate a lot of heat.

In order to achieve the object, To this end, a compact and lightweight motor complex cooling system with compatibility according to the present invention includes: a stator; a rotor mounted on an inner side of the stator; a shaft inserted into an inner side of the rotor, and rotated around a rotary axis; and a cooling unit mounted on an outer side of the stator, and coupled while surrounding a surface of a core portion of the stator, and cooling all components including the stator and the rotor, in which the cooling unit includes a cooling fin mounted in contact with an outer side of a cooling jacket, and in which a protruding portion which is protruded on an outer peripheral surface at a predetermined height, and a groove portion dented at a predetermined depth between the protruding portions are formed alternating with each other, the cooling jacket which is provided between the stator and the cooling fin, and in which a plurality cooling water paths are formed at a predetermined interval in a circumferential direction of the stator to allow cooling water to flow through a cooling water path, and to evenly cool the entirety of the stator including a fore-end portion, a core portion, and a coil winding portion of the stator, and a circulation fan coupled to an outer peripheral surface of the shaft, and rotated in a positive or reverse direction in link with the rotation of the shaft, and circulating internal air.

Further, the cooling unit further includes an air gap passing air which gets out of the cooling fin through the gap formed between the stator and the rotor, and detours a periphery of the fore-end portion or the coil winding portion of the stator between the stator and the rotor.

In addition, the protruding portion and the groove portion of the cooling fin are disposed in the axial direction of the stator and the rotor, and while internal air is circulated in link with a circulation fan by the rotation of the shaft, the internal air is guided to pass through the groove portion formed between the protruding portion and the protruding portion, According to the present invention, an air-cooled radiator used in the conventional air cooling scheme is unnecessary, and only a water-cooled radiator is required, contributing to miniaturization and weight reduction of a device.

Further, according to the present invention, the compact and lightweight motor complex cooling system can be installed in an existing motor.

Further, according to the present invention, the compact and lightweight motor complex cooling system is configured by a combination of air cooling and water cooling using coolant, allowing direct cooling to the end coil windings and the front of shafts of a rotor and a stator by air cooling, and has excellent cooling efficiency through water cooling, so a high-output motor is easily cooled.

DETAILED DESCRIPTION OF THE PREFERRED EMBODIMENT

Figure 1:
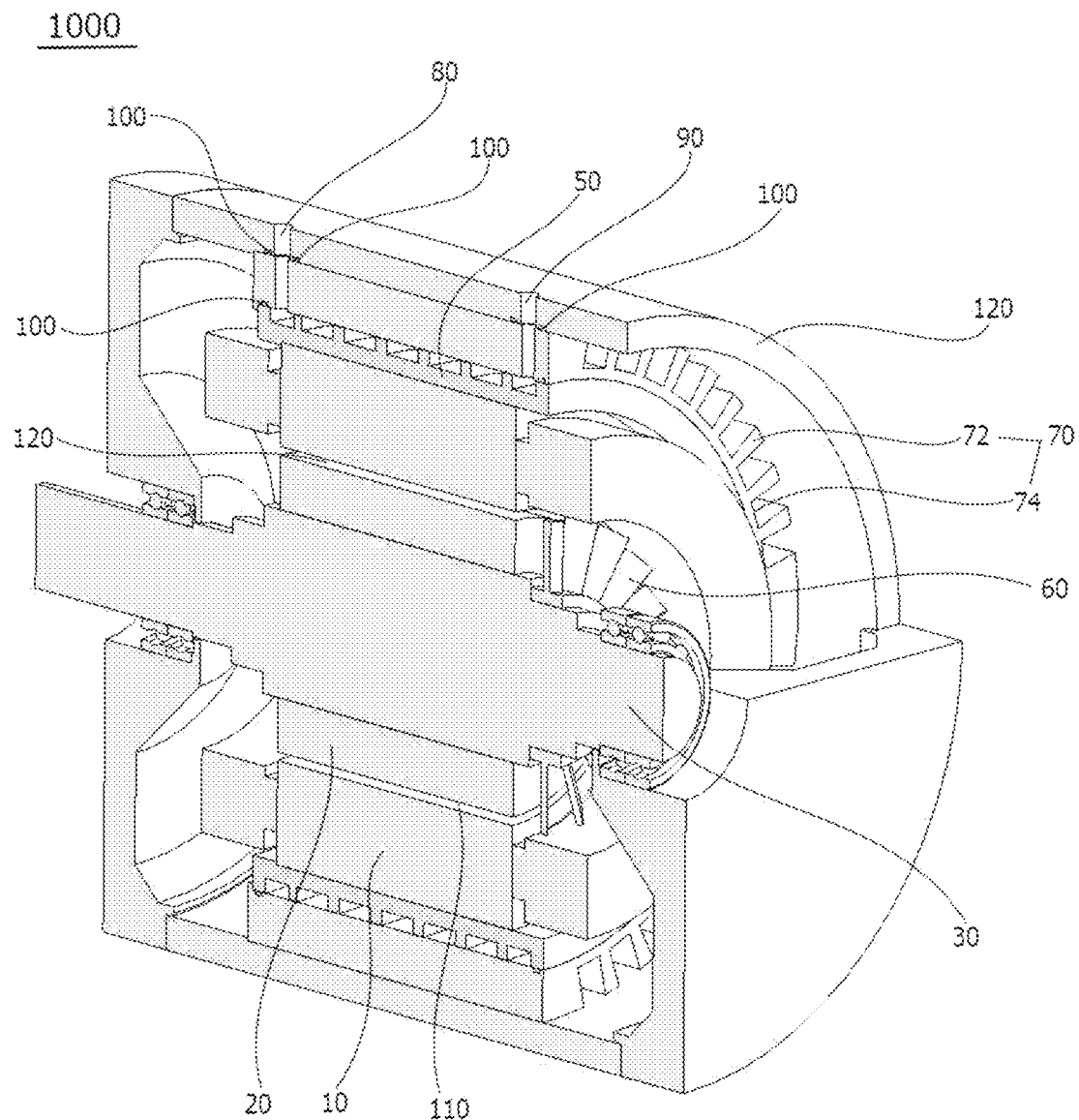
FIG. 1 is a cross-sectional perspective view of a compact and lightweight motor complex cooling system with compatibility according to a preferred embodiment of the present invention.

Hereinafter, a preferred embodiment of the present invention will be described in detail with reference to the accompanying drawings. First, when reference numerals refer to components of each drawing, it is to be noted that although the same components are illustrated in different drawings, the same components are denoted by the same reference numerals as possible. Further, in describing the present invention, a detailed description of known related configurations and functions may be omitted to avoid unnecessarily obscuring the subject matter of the present invention. Further, hereinafter, the preferred embodiment of the present invention will be described, but the technical spirit of the present invention is not limited thereto or restricted thereby and the exemplary embodiments can be modified and variously executed by those skilled in the art.

Figure 2:
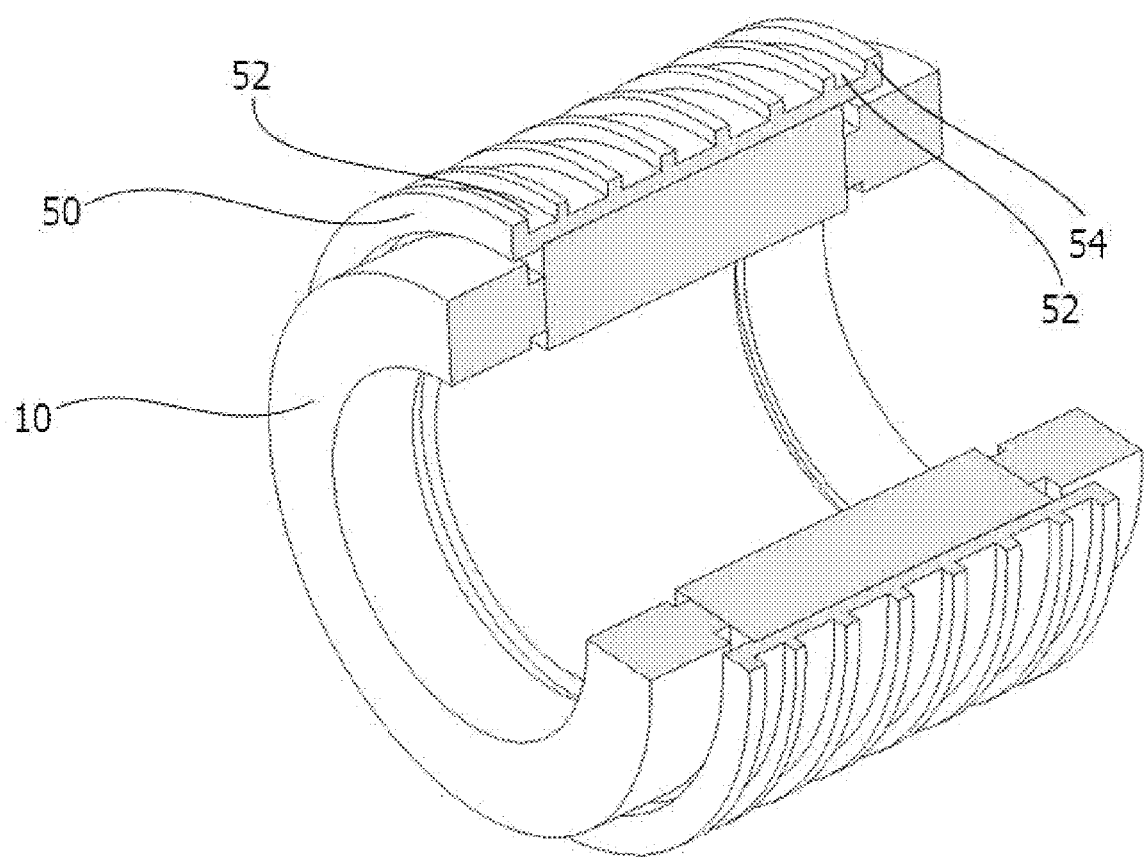
FIG. 2 is a diagram illustrating a state in which a stator and a cooling jacket of the compact and lightweight motor complex cooling system with compatibility are coupled according to a preferred embodiment of the present invention.
Figure 3:
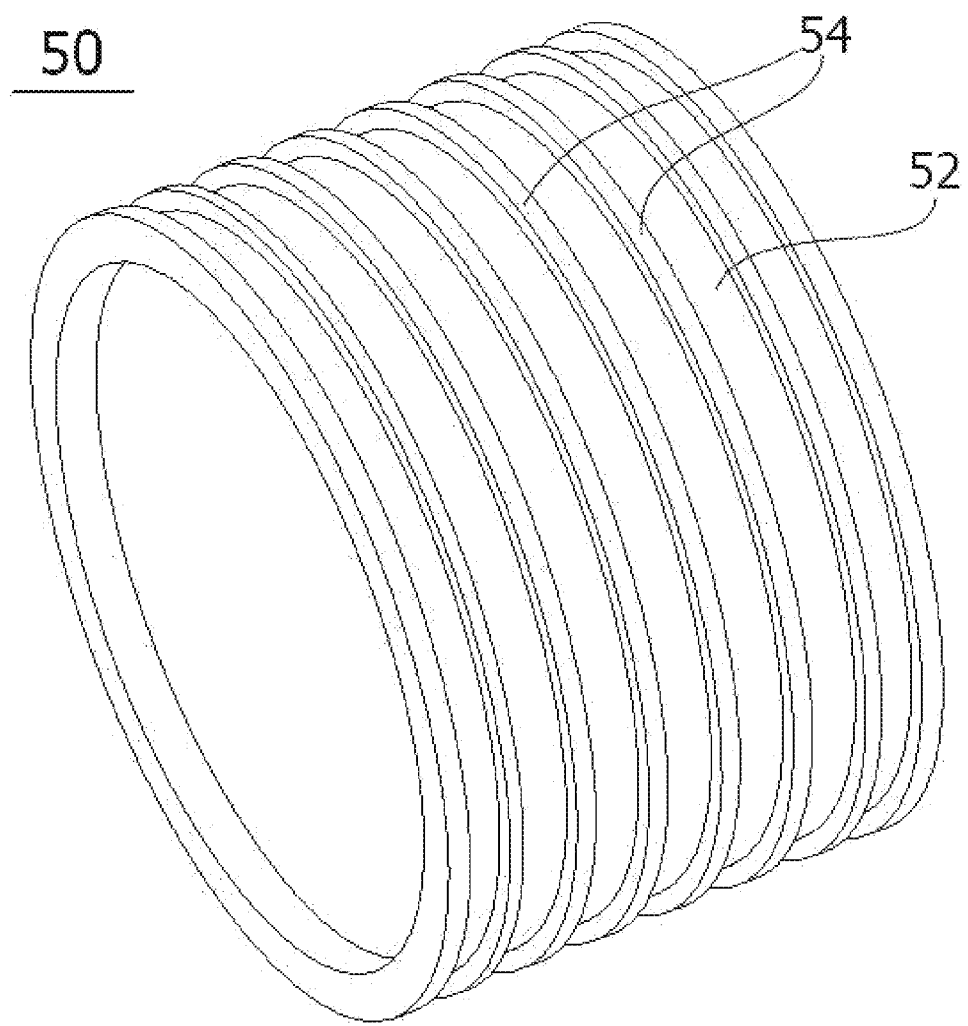
FIG. 3 is a diagram illustrating the cooling jacket of the compact and lightweight motor complex cooling system with compatibility according to a preferred embodiment of the present invention.
Figure 4:
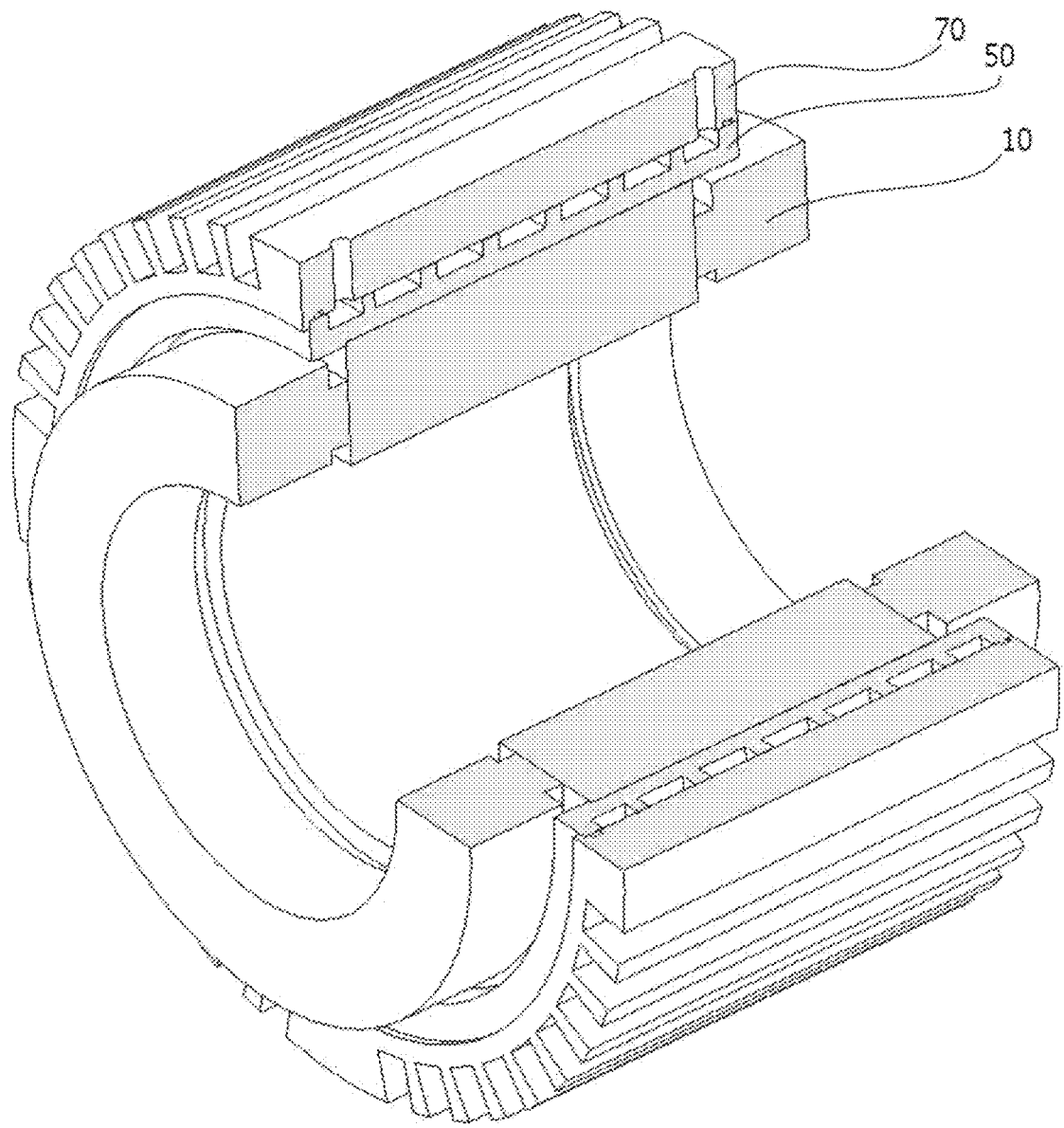
FIG. 4 is a diagram illustrating a state in which the stator and the cooling jacket, and a cooling pin of the compact and lightweight motor complex cooling system with compatibility are coupled according to a preferred embodiment of the present invention.
Figure 5:
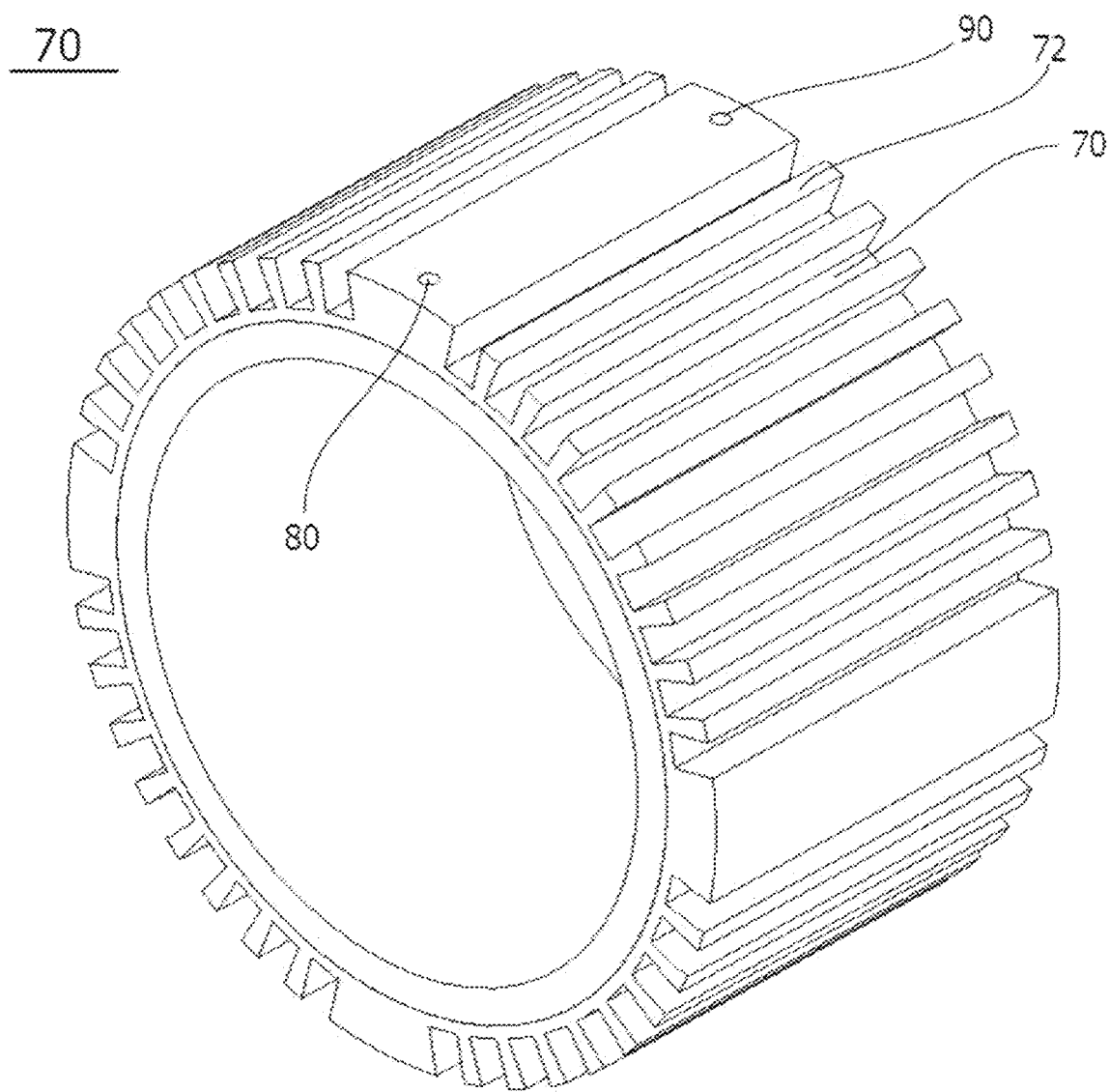
FIG. 5 is a diagram illustrating the cooling jacket of the compact and lightweight motor complex cooling system with compatibility according to a preferred embodiment of the present invention.
Figure 6:
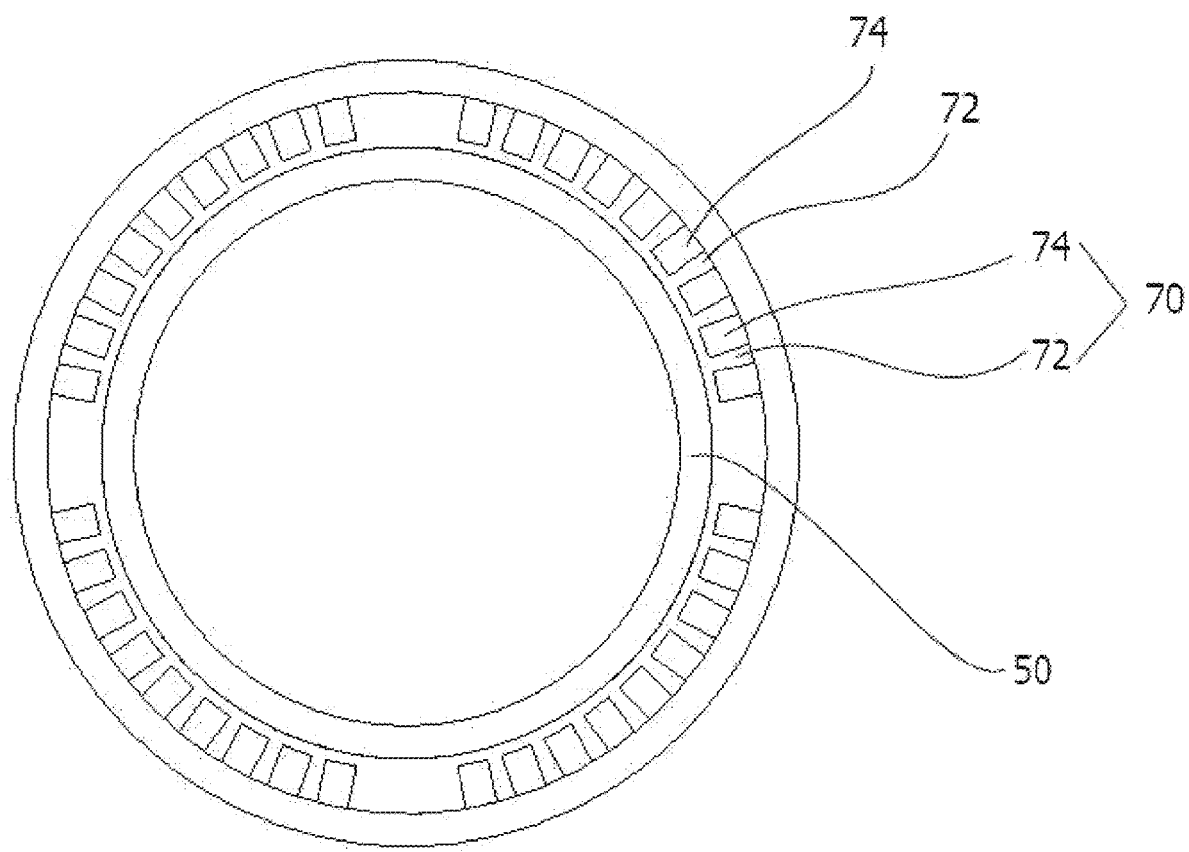
FIG. 6 is a plan view the compact and lightweight motor complex cooling system with compatibility according to a preferred embodiment of the present invention.
Figure 7:
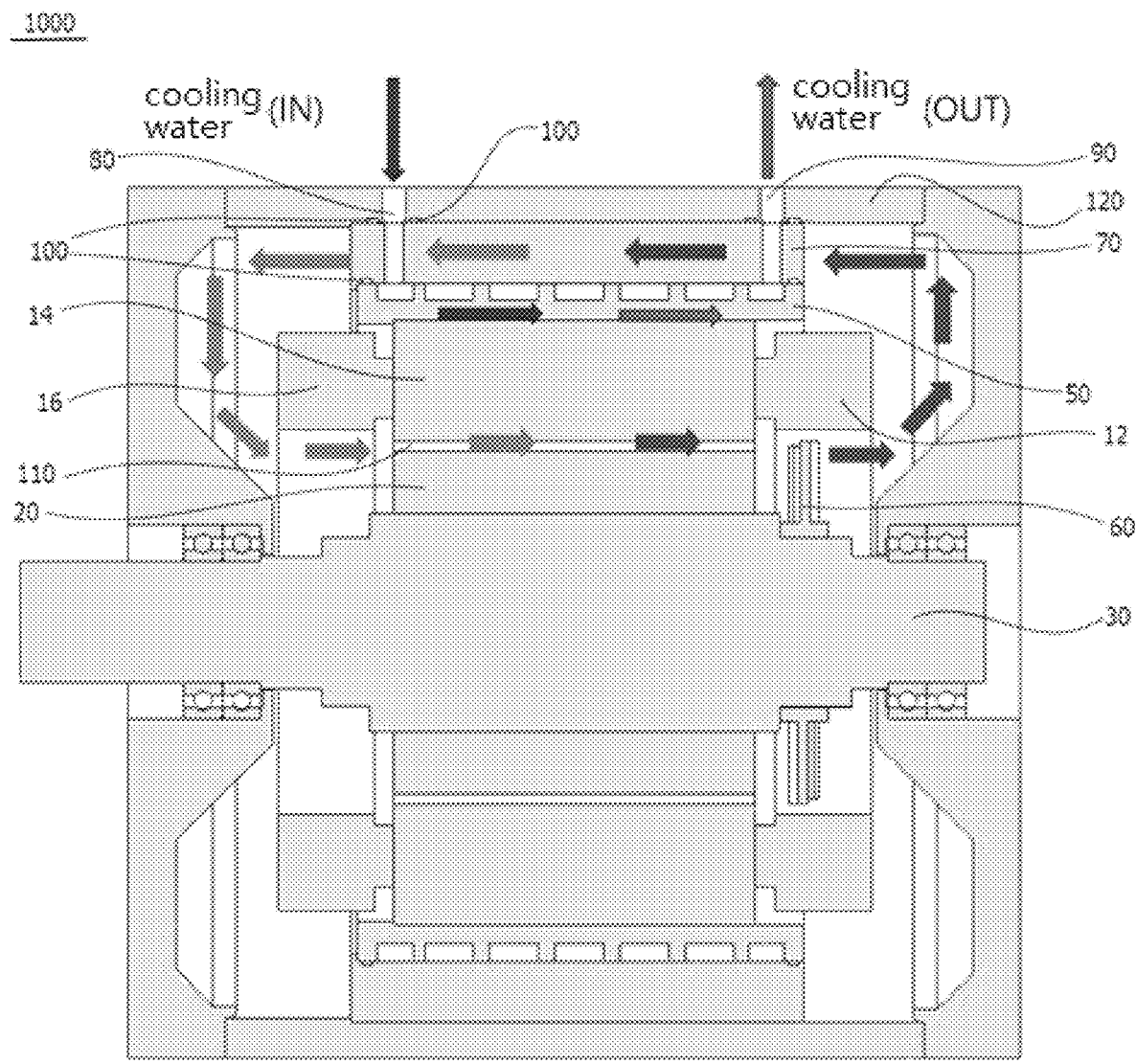
FIG. 7 is a diagram illustrating flows of air and cooling water of the compact and lightweight motor complex cooling system with compatibility according to a preferred embodiment of the present invention.
Figure 8:
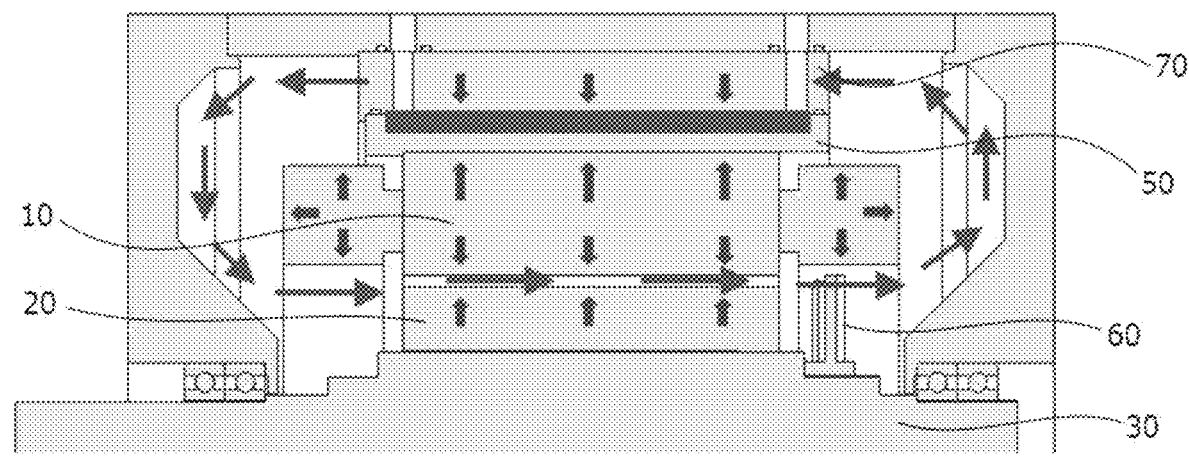
FIGS. 8 and 9 are diagrams illustrating a flow direction of a heat transfer fluid generated from a portion with severe heat generation, and flow directions of the air and the cooling water the compact and lightweight motor complex cooling system with compatibility according to a preferred embodiment of the present invention for effectively cooling the heat.
Figure 9:
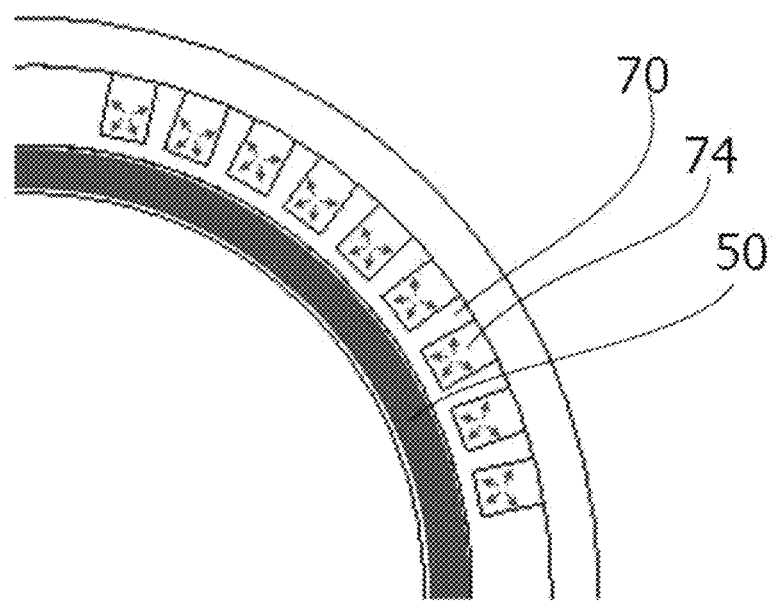

FIG. 1 is a cross-sectional perspective view of a compact and lightweight motor complex cooling system with compatibility according to a preferred embodiment of the present invention, FIG. 2 is a diagram illustrating a state in which a stator and a cooling jacket of the compact and lightweight motor complex cooling system with compatibility are coupled according to a preferred embodiment of the present invention, FIG. 3 is a diagram illustrating the cooling jacket of the compact and lightweight motor complex cooling system with compatibility according to a preferred embodiment of the present invention, FIG. 4 is a diagram illustrating a state in which the stator and the cooling jacket, and a cooling pin of the compact and lightweight motor complex cooling system with compatibility are coupled according to a preferred embodiment of the present invention, FIG. 5 is a diagram illustrating the cooling jacket of the compact and lightweight motor complex cooling system with compatibility according to a preferred embodiment of the present invention, FIG. 6 is a plan view the compact and lightweight motor complex cooling system with compatibility according to a preferred embodiment of the present invention, FIG. 7 is a diagram illustrating flows of air and cooling water of the compact and lightweight motor complex cooling system with compatibility according to a preferred embodiment of the present invention, and FIGS. 8 and 9 are diagrams illustrating a flow direction of a heat transfer fluid generated from a portion with severe heat generation, and flow directions of the air and the cooling water the compact and lightweight motor complex cooling system with compatibility according to a preferred embodiment of the present invention for effectively cooling the heat.

The compact and lightweight motor complex cooling system 1000 with compatibility according to a preferred embodiment of the present invention, as a motor cooling system to which both water-cooling and air-cooling schemes are applied, includes a water-cooled cooling jacket to enhance cooling efficiency, and an air-cooled cooling fin and an air gap, and circulates air drawn in by a fan to the air gap through the cooling fin to not only cool a rotor, which generates a lot of heat, but also cool coils wound at the end of a stator and the front of a shaft.

In addition, the compact and lightweight motor complex cooling system 1000 with compatibility according to a preferred embodiment of the present invention has a structure and means for circulating internal air without introducing air from the outside not to require an air-cooling radiator required in the existing air-cooled scheme, thereby enabling miniaturization and weight reduction, and to bock the inflow of substances from the outside, thereby being also excellent in terms of maintenance.

Further, the compact and lightweight motor complex cooling system 1000 with compatibility according to a preferred embodiment of the present invention has a volume and a weight which are increased as large as a space on which the cooling jacket and the cooling fin, enabling miniaturization and weight reduction.

Problems in the related art in which the conventional motor cooling system, a cooling performance of the rotor is improved by extending a cooling path to a rotary shaft in order to enhance cooling efficiency, so weight reduction is not achieved, and two or more parts are integrally manufactured and applied only a specific model in order to apply a scheme which simultaneously cools two or more different parts (e.g., an inverter and a motor), so compatibility deteriorates, the present invention may be mounted on the existing motor and used, so compatibility is excellent, and miniaturization and weight reduction are enabled.

Hereinafter, components of the compact and lightweight motor complex cooling system 1000 with compatibility according to a preferred embodiment of the present invention will be described in detail.

Referring to FIGS. 1 to 9, the compact and lightweight motor complex cooling system 1000 with compatibility according to a preferred embodiment of the present invention is configured to include a stator 10, a rotor 20, a shaft 30, a cooling unit 40, and a frame 120.

The stator 10 is wound with multiple coils, and generates a magnetic flux at the time of applying power to rotate the rotor 20 by induction power.

The stator 10 is constituted by a coil winding portion 16 which is positioned at a fore-end 12 which is a direction which is the same as a direction in which a front of a shaft 30 is positioned and a distal end which is an opposite direction to the fore-end 12, and wound with coils, and a core portion 14 which is positioned between the fore-end 12 and the coil winding portion 16, and on which the cooling unit 40 according to the present invention is mounted.

The rotor 20 may be mounted on an inner side of the stator 10.

The shaft 30 is inserted into an inner side of the rotator 20 and rotated around a rotary shaft.

The cooling unit 40 is mounted on outer side of the stator 10, and coupled while surrounding a surface of a corer portion 14 of the stator 10, and cools all components including the core portion 14, and the coil winding portion 16 of the stator 10, the rotor 20, and the shaft 30.

The cooling unit 40 has a structure to which both the water-cooled scheme and the air-cooled scheme are applied, and is implemented as a structure in which a cooling water path in which water flows by water-cooled scheme and an air path in which air is circulated by the air-cooled scheme are independent.

More specifically, the cooling unit 40 is configured to include the cooling jacket 50, the circulation fan 60, a cooling fin 70, a cooling water introduction line 80, a cooling water introduction line 80, a cooling water discharge line 90, an airtight seal 100, and an air gap 110.

The cooling jacket 50 is provided between the stator 10 and the cooling fin 70, and mounted while surrounding and contacting the core portion 14 of the stator 10, and a plurality of cooling water paths 52 are formed at a predetermined interval in a circumferential direction of the stator 10, so cooling water may flow through the cooling water paths, and the entirety of the stator 10 including the fore-end 12, the core portion 14, and the coil winding portion 16 of the stator 10 may be evenly cooled.

The cooling water path 52 provides a passage through which the cooling water may move, and multiple cooling water paths 52 are spaced from each other at a predetermined interval in the circumferential direction.

A partition 54 which is protruded is provided between the cooling water path 52 and the cooling water path 52 to induce and control the flow of the cooling water.

The cooling jacket 50 is mounted on an outer surface of the stator 1, and is in close contact with the core portion 14 of the stator 10 to cool the stator 10 in direct contact with the stator 10.

The circulation fan 60 is coupled to an outer peripheral surface of the shaft 30 and rotated in a forward or reverse direction by rotation of the shaft 30 to circulate internal air.

The circulation fan 60 does not introduce air into the motor from the outside, and is actuated by rotation of the rotor inside the motor to induce circulation of internal air. The Circulation Fan 60

Since the structure does not require the air-cooled radiator, the structure has an advantage of weight reduction and miniaturization.

The cooling fin 70 is mounted in contact with the outer side of the cooling jacket 50, and in the cooling fin 70, a protruding portion 72 which is protruded on an outer peripheral surface at a predetermined height in an outward direction, and a groove portion 74 formed between the protruding portions 72 and dented at a predetermined depth are formed alternating with each other, and the air flowing by the circulation fan 60 is guided to pass through the groove portion 74 between the protruding portions 72.

Further, the protruding portion 72 and the groove portion 74 of the cooling fin 70 are disposed in the axial direction of the stator 10 and the rotator 20, and the internal air is circulated in link with the circulation fan 60 by rotation of the shaft 30, and flows through the protrusion 74 formed between the protruding portions 72.

A structure is provided in which the air passes through a periphery of the fore-end portion of the stator 10, and flows up to the coil winding portion 16 at the distal end of the stator 10 via the core portion 14 of the stator, which allows an entire part of the stator 10 including the coil winding portion 16 positioned at the distal end of the stator 10 which generates a lot of heat as external wires are drawn and the quantity of wires is large to be cooled.

In particular, the air passing through the groove portion 74 of the cooling fin 70 may be directly provided to the coil winding portion 16 positioned at the distal end of the stator 10 to easily cool the winding portion at the distal end of the stator which generates a lot of heat.

The cooling water introduction line 80 allows has a hole of which inner part is penetrated from a frame 120 to the cooling fin 70, and allows the cooling water to flow into the penetrated hole and reach the cooling jacket 50.

Holes formed in the cooling water introduction line 80 and the cooling water discharge line 90 are formed with a location and a width corresponding to the cooling water path 52 of the cooling jacket 50, and allow the cooling water to be supplied to the location at which the cooling jacket 50 is positioned when the cooling water is introduced from the outside, and allows the cooling water to be accurately discharged from the location at which the cooling jacket 50 is positioned when the cooling water is discharged from the cooling jacket 50.

The cooling water discharge line 90 is formed to be spaced apart from the cooling water introduction line 90 at a predetermined interval, and is in communication with the frame 120 and the cooling fin 70, and has a hole which is penetrated at a predetermined depth in a longitudinal direction, and discharges the cooling water is introduced into the cooling water introduction line 80 and circulated through the cooling water path 52 of the cooling jacket 50.

The cooling water supplied to the cooling water introduction line 80 is circulated along the cooling water path 52 of the cooling jacket 50, and then discharged to the cooling water discharge line 90. In respect to a flowing direction of the cooling water, the cooling water is circulated in the circumferential direction of the stator 10, and the cooling water introduced into the cooling water introduction line 80 flows in the circumferential direction of the stator 10, and cools a circumferential surface of the stator 10.

The airtight seal 100 is provided on a contact surface between the cooling fin 70 and the frame 10, and is sealed on a contact surface between the cooling jacket 50 and the cooling fin 70 to prevent the cooling water from being leaked to the inside.

Specifically, the airtight seal 100 are sealed to a surface contacting the partition 54 of the cooling fin 70 and the cooling jacket 50, and surfaces contacting the cooling fin 70 and the frame 120, which are both surfaces of an internal passage where the cooling water introduction line 80 and the cooling water discharge line 90 are formed, respectively.

The air gap 110 as a gap formed between the stator 10 and the rotor 20 allows air which gets out of the cooling fin 70 and detours the periphery of the fore-end portion 12 or the coil winding portion 16 of the stator 10 to pass between the stator 10 and the rotor 20.

The circulation fan 70 is rotated in link with the rotation of the shaft 30, which cools the periphery of the fore-end portion 12 of the stator 10, and air cools the periphery of the coil winding portion 14 of the stator 10 again while passing through the cooling fin 70, and then is transferred to the shafts of the stator 10 and the rotor 20 while passing through the air gap 110 formed between the stator 10 and the rotor 20 to cool the stator 10, the rotor 20, and the shaft 30.

Air cooling is performed while an internal circulation process of the air is continuously performed.

When the air passes between the stator 10 and the rotor 20 while passing through the air gap 110, the stator 10, the rotor 20, and the shaft 30 are cooled, and is repeatedly internally circulated while the air passes through the cooling fin 70 again while detouring the periphery of the fore-end portion 12 of the stator 10 by the circulation fan 60 again after passing through the air gap 110.

In this case, while the air is introduced into the air gap 110, the stator 10 and the rotor 20 positioned at both sides of the air gap 110 are simultaneously cooled to effectively cool heat generated from the stator 10 and the rotor 20.

The frame 120 is mounted on the outside of the cooling unit 40, and provided to protect internal components including the stator 10, the rotor 20, the shaft 30, and the cooling unit 40.

FIGS. 8 and 9 are diagrams illustrating a flowing direction (red indicator) of a heat transfer fluid of a heating unit and flowing directions (blue indicator) of air and cooling water of the system according to the present invention, which cool the heating unit.

Referring to FIG. 8, when the heat is discharged to the outside from the heating unit, air is circulated in a predetermined direction inside the motor while air current is formed by rotation of the circulation fan 60. In particular, the air current is formed around a surface discharging heat to cool the fore-end portion 12 and the coil winding portion 16 of the stator 10, and while air flows through the gap (air gap 110) formed between the stator 10 and the rotor 20, a gap between a surface of the stator 10 and a surface of the rotor 20 discharging heat is cooled.

Further, referring to FIG. 9, heated air passing through the cooling fin 70 is cooled by the cooling jacket 50 disposed on the inner surface of the cooling fin 70, and performs cooling while circulating inside.

The above description just illustrates the technical spirit of the present invention and various changes, modifications, and substitutions can be made by those skilled in the art to which the present invention pertains without departing from an essential characteristic of the present invention. Therefore, the exemplary embodiments and the accompanying drawings disclosed in the present invention are used to not limit but describe the technical spirit of the present invention and the scope of the technical spirit of the present invention is not limited by the exemplary embodiments and the accompanying drawings. The protection scope of the present invention should be construed based on the following appended claims and it should be appreciated that the technical spirit included within the scope equivalent to the claims belongs to the scope of the present invention.

What is claimed is:
1. A compact and lightweight motor complex cooling system with compatibility, comprising:
a stator;
a rotor mounted on an inner side of the stator;
a shaft inserted into an inner side of the rotor, and rotated around a rotary axis; and
a cooling unit mounted on an outer side of the stator, and coupled while surrounding a surface of a core portion of the stator, and cooling all components including the stator and the rotor,
wherein the cooling unit includes a cooling fin mounted in contact with an outer side of a cooling jacket, and in which a protruding portion which is protruded on an outer peripheral surface at a predetermined height, and a groove portion dented at a predetermined depth between protruding portions are formed alternating with each other,
the cooling jacket which is provided between the stator and the cooling fin, and in which a plurality of cooling water paths are formed at a predetermined interval in a circumferential direction of the stator to allow cooling water to flow through a cooling water path, and to evenly cool an entirety of the stator including a fore-end portion, the core portion, and a coil winding portion of the stator, the cooling jacket including a base part of which a bottom side contacts with the stator, a plurality of partitions formed as one body with the base part on a top side of the base part, and the plurality cooling water paths formed between adjacent ones of the plurality of partitions, wherein a first partition of the plurality of partitions is formed at a first end portion of the base part such that a side surface of the first partition is aligned with a side surface of the first end portion of the base part on a same plane, and a second partition of the plurality of partitions is formed at a second end portion of the base part such that a side surface of the second partition is aligned with a side surface of the second end portion of the base part on a same plane,
a circulation fan coupled to an outer peripheral surface of the shaft, and rotated in a positive or reverse direction in link with the rotation of the shaft, and circulating internal air,
an air gap passing air which gets out of the cooling fin through a gap formed between the stator and the rotor, and detours a periphery of the fore-end portion or the coil winding portion of the stator between the stator and the rotor,
a cooling water introduction line in which a hole of which an inner part is penetrated from a frame to the cooling fin is provided and the cooling water is introduced into the penetrated hole, and reaches the cooling jacket,
a cooling water discharge line formed to be spaced apart from the cooling water introduction line, having a hole which is in communication with the frame and the cooling fin, and is penetrated at a predetermined depth in a longitudinal direction, and discharging the cooling water circulated through the cooling water path of the cooling jacket, and
a first airtight seal placed between a top surface of the first partition and a bottom surface of the cooling fin, and a second airtight seal placed between a top surface of the second partition and the bottom surface of the cooling fin, wherein the first and second airtight seals prevent the cooling water from leaking out of the cooling jacket,
a third airtight seal placed between a top surface of the cooling fin and the frame such that the third airtight seal prevents the cooling water from leaking out of the cooling water introduction line, and a fourth airtight seal placed between the top surface of the cooling fin and the frame such that the fourth airtight seal prevents the cooling water from leaking out of the cooling water discharge line,
the protruding portion and the groove portion of the cooling fin are disposed in an axial direction of the stator and the rotor, and while internal air is circulated in link with a circulation fan by the rotation of the shaft, the internal air is guided to pass through the groove portion formed between the protruding portion and the protruding portion, the holes formed in the cooling water introduction line and the cooling water discharge line are formed at locations and corresponding points of the cooling water path formed at both distal ends of the cooling jacket to be in communication with the cooling water paths of the cooling jacket, and the cooling jacket and the cooling fin are configured with compact sizes to be mounted on an outer side of the core portion of the stator.

\* \* \* \* \*